Figure 1:
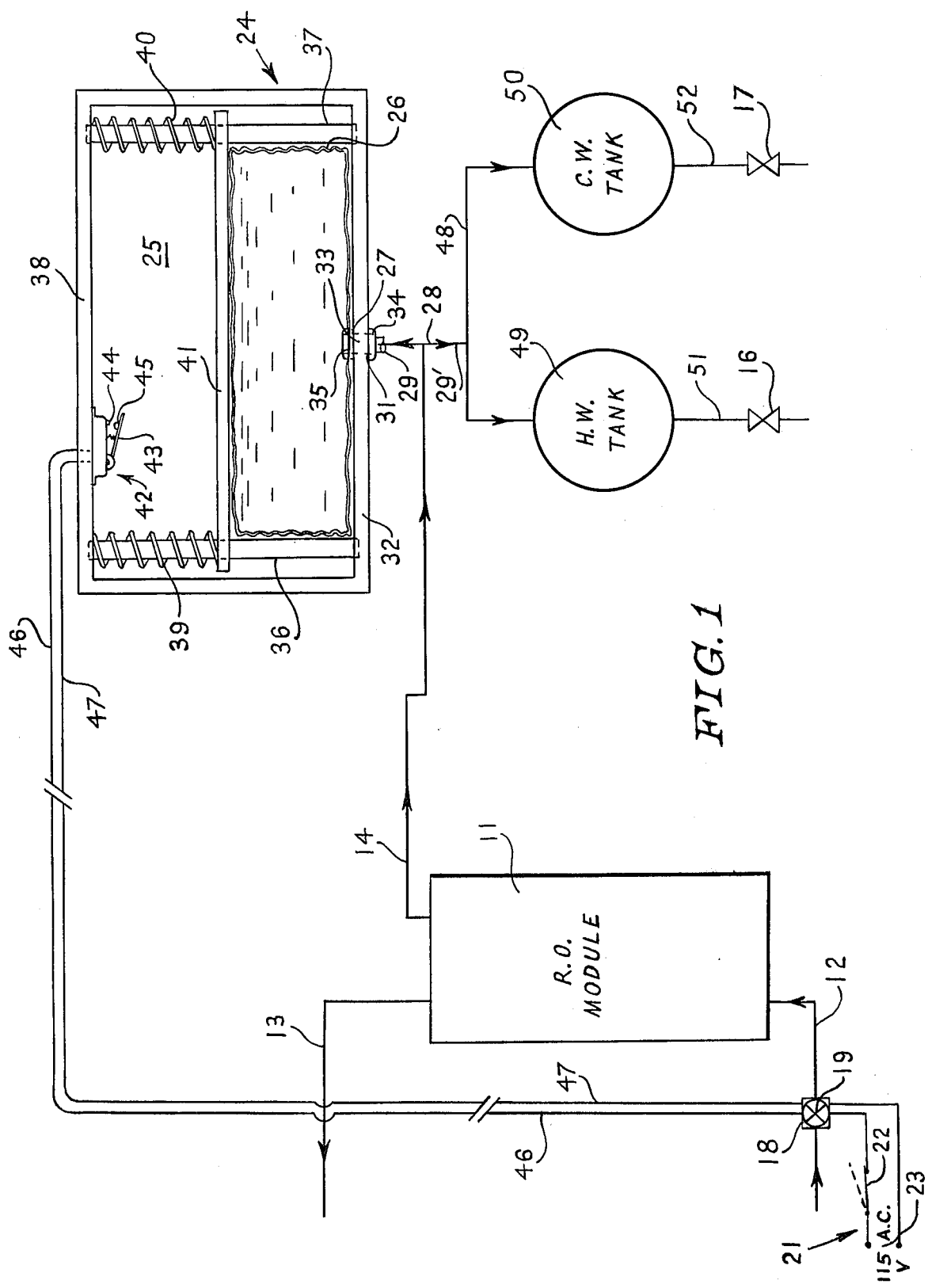

United States Patent [19]

Gossett et al.

[11] 4,014,792
[45] Mar. 29, 1977

[54] AIR AND LIGHT IMPERVIOUS WATER PURIFICATION AND PRODUCT DISPENSING SYSTEM

[76] Inventors: Charles W. Gossett, 14025 Crenshaw Blvd., Hawthorne, Calif. 90250; William J. Dauenhauer, P.O. Box 487, Gualala, Calif. 95445

[22] Filed: June 14, 1976

[21] Appl. No.: 695,367

[52] U.S. Cl. .............................. 210/123; 210/125; 210/128; 210/257 M; 210/321 R
[51] Int. Cl.² ........................................ B01D 31/00
[58] Field of Search .......... 210/104, 110, 123, 125, 210/128, 321 R, 257 M

[56] References Cited

UNITED STATES PATENTS

| | | | |
|---|---|---|---|
| 3,390,773 | 7/1968 | Merten | 210/125 |
| 3,397,785 | 8/1968 | Jarvis et al. | 210/125 |
| 3,831,757 | 8/1974 | Gossett et al. | 210/257 M |
| 3,931,009 | 1/1976 | Davis | 210/123 X |

*Primary Examiner*—John Adee

[57] ABSTRACT

A closed system of cyclically storing and dispensing nearly pure water discharged from a reverse osmosis module which is free from exposure to light and air.

5 Claims, 1 Drawing Figure

AIR AND LIGHT IMPERVIOUS WATER PURIFICATION AND PRODUCT DISPENSING SYSTEM

The present invention is a further improvement upon our prior inventions in this art which are disclosed and claimed in U. S. Pat, No. 3,831,757, issued to us on Aug. 27, 1974, and entitled "WATER PURIFICATION AND DISTRIBUTION SYSTEM" as well as in our pending patent application, Ser. No. 506739, filed Sept. 16, 197 , and entitled "SYSTEM OF WATER PURIFICATION AND PRODUCT DISTRIBUTION".

A primary object of the present invention is to provide a water purification and distribution system wherein a reverse osmosis module product is protected from contamination by reducing to a minimum its exposure to air and light.

Another important object of our improvement is to provide an air and light impervious water purification and distribution system of the indicated nature which is additionally characterized by the utilization of spring compression as a source of flow pressure in the product dispensing line as an aid to gravity flow.

A still further object of our invention is to provide an air and light impervious water purification and distribution system of the aforementioned character which is especially adaptable as an increased storage unit for conventional office water dispensers.

A further object of the invention is to provide at minimal added expense and requiring little if any maintenance a greater volume of cylically replenishable nearly pure water as an adaptation to a conventional office water dispenser.

Other objects of the invention, together with some of the advantageous features thereof, will appear from the following description of an embodiment thereof illustrated in the accompanying drawings which is an exemplification of the best mode of construction and manner of using the invention. It is to be understood that the appended claims are intended to cover not only the embodiment shown but also to modifications and variations thereof within the scope and purview of the invention.

Referring to the drawings:

The single view, designated FIG. 1, is a diagrammatic flow scheme of a preferred embodiment of the invention.

In its preferred mode of construction and the manner of using the same, our improvement in an air and light impervious water purification and distribution system preferably comprises, in combination with a conventional water service valve-controlled line, a reverse osmosis module connected into said line for recurrently receiving a supply of raw water from said line and purifying the same to emanate a nearly pure product water from its outlet, an electrical circuit, a solenoid in said circuit for opening and closing said line, a switch for opening and closing said circuit recurrently, together with a water storage sealed collapsible bag in communication with the outlet of said reverse osmosis module, a sealed box having a chamber for holding said collapsible bag, a spring-loaded floating plate in said chamber in engagement with said bag for recurrently actuating said switch to close said circuit and shut said water service line upon the complete filling of said bag with the nearly pure product water of said module, and a valve controlled product distribution line through which product water is dispensed by force of gravity from said bag upon the opening of a faucet or a series of faucets connected into said production distribution line aided by spring compression derived from said spring-loaded floating plate.

In accordance with our invention, at least one standard reverse osmosis module, which is designated generally by the reference numeral 11, is connected to a source of impure water such as to a storage tank, not shown, or to a valve-controlled water servie line 12; such one or more modules 11 functioning to separate out impurities from the supplied water and rejecting them with a portion of the water that is fed thereinto and that passed over the top of a perforated cellulose acetate film or membrane, not shown, to be discharged as concentrate through a waste or drain pipe 13 while a portion of the feed water is forced through the pores of the film to be passed out of the module as the permeate or nearly pure product water and into and through a distributing pipe 14 tapped with one, two or more manually operable valves or faucets, as indicated by the reference numerals 16 and 17. The impure or raw water supplied in line 12 flows and is initially stored in a valve body 18 connected into the line upstream from the reverse osmosis module 11 containing a solenoidactuated valve 19 for closing and opening the valve; the solenoid being connected into an electrical circuit 21 containing a permanently closed switch 22 and deriving its energy from a 115volt, alternating current source indicated at 23, such as the standard 60 cycle alternating current transmission line normally present in homes and dwellings and office buildings.

As illustrated in the accompanying flow scheme, our improved system also comprises a box 24 having a relatively large interior chamber 25 which houses a collapsible storage bag 26 in direct communication by means of a standard sealed pipe connection 27 with the nearly pure water product distribution line or pipe 14 through a tee-connector 28 and pipe section 29; the sealed pipe connection 27 extending through a hole 31 in the bottom 32 of box 24 as well as through a hole 33 in bag 26 with standard teflon or other sealing washers 34 and 35, respectively encircling the pipe connection 27 at the holes 31 and 33 respectively to seal the box and bag against leakage. In accordance with our invention four posts of which but two are shown at 36 and 37 are connected to the top 38 and bottom 32 of the box 24 at the four corners within chambers 25 thereof, and we encircle each of the four posts with coil springs, as indicated at 39 and 40, respectively, for holding a floating plate 41 in engagement with the collapsible bag 26; such springs under tension normally urging the plate 41 against the bag and being confined between the plate and the inner surface of the top 38 of box 24. Secured to the inner surface of the top of the box is a conventional micro switch 42 provided with a pivotally mounted lever 43 and with electrically conductive contacts 44 and 45 connected into the electrical circuit 21 by means of its leads 46 and 47 which are extended through holes, not shown, in the top and connected to the micro-switch electrical contacts 44 and 45, respectively.

The collapsible bag 26 is molded from any suitable water-tight plastic material, such as polyvinyl chloride or the like, having sufficient strength capable of withstanding water pressure approximating 10 to 50 pounds per square inch, yet pliable enough to collapse when emptied of water. The overlying plate 41 is made to sufficient dimensions to extend to the four corners of the chamber 25 of box 24 and is formed with cut-outs to permit the passage of the spring-encircled posts, as indicated at 39 and 40, at the four corners of the box. The plate 41 may be fabricated from a light-weight metal, such as thin steel or from aluminum, or can be molded from plywood, masonite or any suitable plastic, such as polystyrene or the like, and likewise be capable of withstanding a water pressure approximating 10 to 50 psi.

In accordance with our present improvement, a pipe section 29' is in communication with and extends from tee-connector 28 leading directly to the faucets 16 and 17, or can be connected to a header 48 for distributing the nearly pure water from the outlet of the reverse osmosis module 11 through a suitable mixing valve, not shown, connected to hot and cold water dispensers or cold or room temperature dispensers to suitable storage tanks 49 and 50 and thence from such storage tanks 49 and 50 directly through short water lines 51 and 52, respectively to the faucets 16 and 17, respectively.

In operation, the raw water in service line 12 enters the valve body 18 and with the valve 19 open flows to the inlet of the reverse osmosis module 11 and from the outlet of the module to the tee 28 placed in the product line 14 from one side of which the nearly pure product water flows through a pipe section 29 to the collapsible plastic bag 26 in box 24. As the bag fills with the nearly pure water, floating plate 41 rises to engage and move the pivotal lever 43 on micro switch 42 to close contacts 44 and 45 thereof as well as close the energized circuit which, in turn energizes the solenoid therein, not shown to shut the valve 19 and stop the flow of raw water. As the water is taken from the bag by virtue of flow pressure derived by force of gravity aided by spring compression during the compression of the coil springs 39 and 40 by floating plate 41 which disengages the micro-switch and opens the circuit which in turn opens valve 19, thus permitting flow of raw water through the line 12 to the reverse osmosis module 11. This cycle of flow of raw water and nearly pure product water from the module 11 is recurrently repeated as product water is withdrawn from faucets 16 and 17.

It is clear that our improved system is closed to air and light, thereby preventing contamination of the product water with bacteria and algae. The system is relatively inexpensive to manufacture and install either as a separate and independent system or as an adjunct to existing water dispensing units to provide nearly pure water not theretofore available.

The appended claims are intended to cover not only the embodiment depicted in the annexed drawing but also modifications or variations thereof constructed within the scope and purview of the invention.

We claim:

1. An air and light impervious water purification and product distribution system comprising, in combination with a water supply line and with a reverse osmosis module connected into said line for recurrently receiving water from said water supply line and for removing impurities therefrom to provide a nearly pure water product at its outlet orifice, a faucetcontrolled water distribution line in communication with the nearly pure water product outlet orifice of said reverse osmosis module for dispensing the water product thereof, a box having an interior chamber therein, a reservoir within said box for storing the water product of said module, an inlet means establishing communication between said water distribution line and said reservoir for transmitting to and storing in said reservoir repetitive volumes of said nearly pure water product of said reverse osmosis module, a spring-loaded floating plate confined with such chamber, an electrical circuit, a switch connected into said circuit and secured to the top of said box within said chamber; said switch being adapted to be recurrently closed and opened by said floating plate upon the complete filling of said reservoir and emptying thereof, and solenoid-actuated valve connected into said water supply line for controlling the flow of water therein in response to the closing and opening of said electrical citcuit in which the solenoid of said solenoid-actuated valve is connected.

2. An air and light impervious water purification and product distribution system as set forth in claim 1 wherein said reservoir comprises a sealed collapsible plastic bag having an inlet through which repetitive amounts of nearly pure water product of said reverse osmosis module enters and leaves the bag.

3. An air and light impervious water purification and product distribution system as set forth in claim 2 wherein said means establishing communication between said bag and said water distribution line comprises a pipe connection fitting said inlet of said bag, a first pipe section in communication with said pipe connection, and a tee joining said first pipe section to said water distribution line.

4. An air and light impervious water purification and product distribution system as set forth in claim 3, and a second pipe section connected to said tee and establishing communication between said water distribution line and said faucet.

5. An air and light impervious water purification and distribution system as set forth in claim 2, and a plurality of posts connected to the top and bottom of said box adjacent to the corners thereof, a coil spring encircling each of said posts and confined between said floating plate and the top of said box; said springs being compressed by said plate during the filling of said plastic bag.

* * * * *